M. L. HALL.
NUT LOCK.
APPLICATION FILED DEC. 22, 1917.
1,323,467.
Patented Dec. 2, 1919
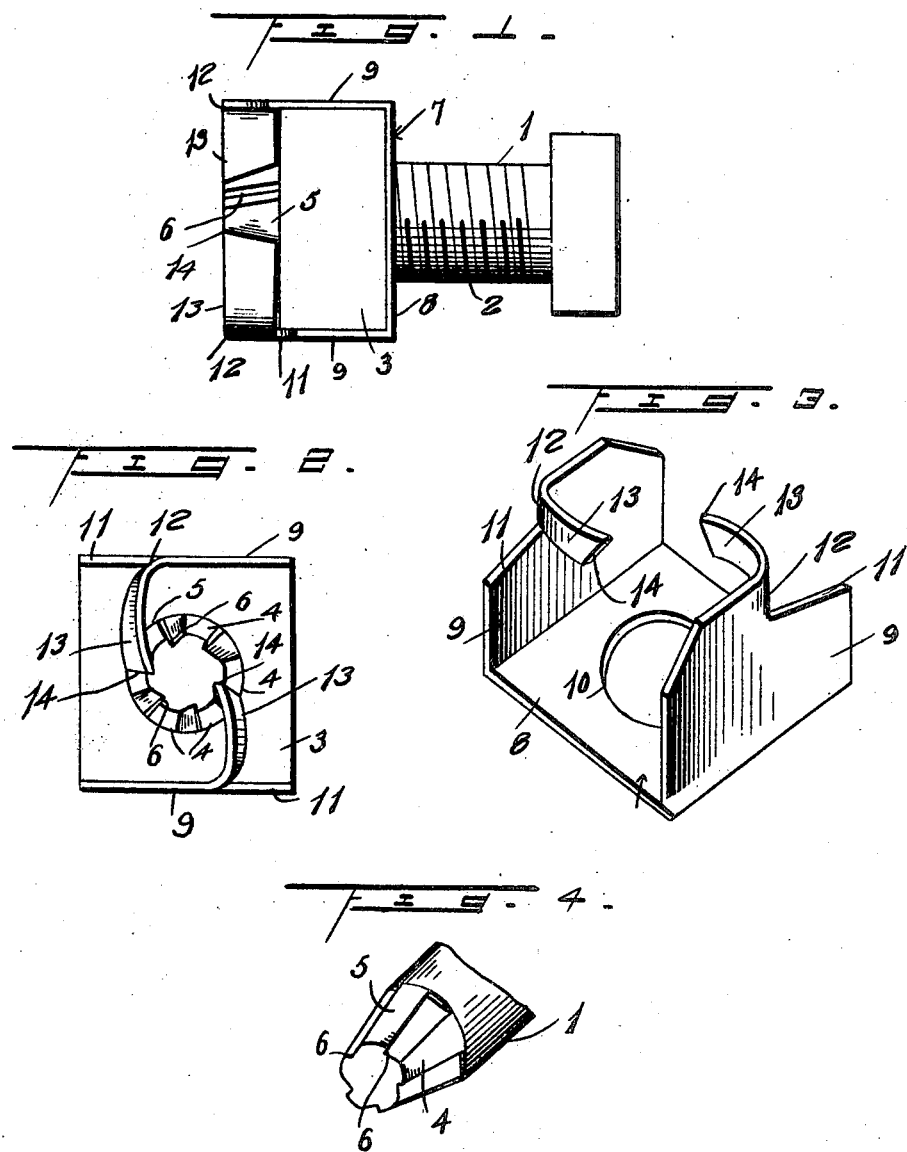

UNITED STATES PATENT OFFICE.

MENDEN L. HALL, OF LEESVILLE, SOUTH CAROLINA.

NUT-LOCK.

1,323,467.　　　　Specification of Letters Patent.　　Patented Dec. 2, 1919.

Application filed December 22, 1917. Serial No. 208,449.

*To all whom it may concern:*

Be it known that I, MENDEN L. HALL, a citizen of the United States, residing at Leesville, in the county of Lexington and State of South Carolina, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks, and the primary object of the invention is to provide means carried by the nut for engaging the bolt to prevent retrograde movement of the nut on the bolt, so as to eliminate the jarring and loosening of the nut off of the bolt.

A further object of the invention is to provide an improved nut lock of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawing forming a part thereof in which:

Figure 1 is a side elevation of the improved nut lock.

Fig. 2 is a plan view of the improved lock nut.

Fig. 3 is a detail perspective view of the means carried by the nut for engaging the bolt to prevent retrograde movement of the nut.

Fig. 4 is a detail perspective view of one end of the bolt.

Referring to the drawing, in detail wherein similar reference numerals designate corresponding parts, throughout the several views, the numeral 1 indicates the bolt provided with the ordinary threads 2 upon which is turned the ordinary type of nut 3. The outer end of the bolt 1 is tapered as at 4 to provide a substantially frusto-conical member 5. The tapered portion 4 is provided with a plurality of ratchet teeth 6 which extend the entire length of the tapered portion. The teeth 6 are adapted to be engaged by spring dogs, which will be hereinafter more fully described.

The locking member 7 includes a substantially U-shaped plate which includes the bight portion 8 and the legs 9. The bight portion 8 is provided with the central opening 10 which slidably receives the bolt 2. The legs 9 are provided with oppositely extending inclined slots 11 and the portions lying between the slots and the upper portions of the legs are bent inwardly as at 12 to provide spring dogs 13. The dogs 13 are also twisted to provide the outer ends of the same with an inclined edge 14 to conform to the slanting surface of the end 4 of the bolt 1. The dogs 13 are so arranged as to engage the opposite sides of the tapered end 4 of the bolt and for engaging in the ratchet teeth 6. The U-shaped member 7 receives the nut 3 between the legs 9 thereof and the bight portion 8 engages the bottom surface of the nut. The opening 10 formed in the bight portion 8 registers with the bore of the nut and when the nut is rotated the U-shaped member 7 will be rotated therewith. Thus, on screwing the nut 3 on the bolt 1, the dogs 13 slide over the ratchet teeth, but when the nut is turned in the opposite direction the dogs engage the shoulders of the ratchet teeth 6 and prevent movement of the nut. The U-shaped member 7 is preferably formed of spring metal and the legs 9 are bent so as to resiliently engage the sides of the nut and prevent the same from slipping off of the nut.

From the foregoing description it can be seen that an improved nut lock is provided which will effectively prevent the rotation of the nut in a retrograde direction and one that is extremely simple and durable in construction.

In practice, I have found that the form of my invention illustrated in the accompanying drawing and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

In a device of the class described, the combination with a bolt having a threaded shank, the outer end of the shank being of substantially frusto-conical shape and provided with a plurality of ratchet teeth, a nut turned on the shank, a plate detachably carried by the nut, wings formed on the side edges of the plate and engaging the side edges of the side edges of the nut and extending above the same, said wings being provided with oppositely inclined slots and being bent inwardly to provide resilient dogs, said dogs being twisted and arranged to engage the frusto-conical portions of the teeth of the shank.

In testimony whereof I affix my signature in presence of two witnesses.

MENDEN L. HALL.

Witnesses:
JULIAN Y. GANTT,
T. A. RAWL.